United States Patent [19]

Nakahara et al.

[11] 4,315,245
[45] Feb. 9, 1982

[54] OPTICAL INFORMATION READING DEVICE

[75] Inventors: Tsuneo Nakahara; Kenichi Yoshida; Koichi Tsuno; Isao Isshiki, all of Osaka, Japan

[73] Assignee: Sumitomo Electric Industries, Ltd., Osaka, Japan

[21] Appl. No.: 27,416

[22] Filed: Apr. 5, 1979

[30] Foreign Application Priority Data

Apr. 5, 1978 [JP] Japan .................. 53/40011

[51] Int. Cl.³ .................................. G06K 9/22
[52] U.S. Cl. .......................... 340/146.3 AG; 235/455;
235/472; 250/205; 250/568
[58] Field of Search .............. 340/146.3 AG, 146.3 K,
340/146.3 Z, 146.3 R, 146.3 MA, 146.3 SY;
235/455, 472; 250/205, 567, 568; 358/282

[56] References Cited

U.S. PATENT DOCUMENTS

| | | | |
|---|---|---|---|
| 3,467,820 | 9/1969 | Droege et al. | 250/205 |
| 3,517,167 | 6/1970 | Bell | 250/205 |
| 3,533,068 | 10/1970 | Hanaki et al. | 340/146.3 AG |
| 3,760,162 | 9/1973 | Holter | 235/455 |
| 3,812,347 | 5/1974 | Cuningham et al. | 250/568 |
| 3,911,270 | 10/1975 | Traub | 235/472 |
| 3,931,513 | 1/1976 | Germain | 250/205 |
| 3,947,817 | 3/1976 | Requa | 340/146.3 MA |
| 4,078,173 | 3/1978 | Fultz | 250/205 |
| 4,143,358 | 3/1979 | Neff | 340/146.3 SY |
| 4,182,956 | 1/1980 | Funk, Jr. et al. | 250/568 |
| 4,200,391 | 4/1980 | Sakamoto et al. | 250/205 |

OTHER PUBLICATIONS

Thomas et al., "Digital Feedback Light-Emitting Diode Control," *IBM Tech. Disclosure Bulletin*, vol. 16, No. 8, Jan. 1974, pp. 2598-2600.

Dattilo et al., "Variable Intensity Illumination Scanner Calibration System," *IBM Tech. Disclosure Bulletin*, vol. 21, No. 9, Feb. 1979, pp. 3546-3547.

*Primary Examiner*—Leo H. Boudreau
*Attorney, Agent, or Firm*—Sughrue, Mion, Zinn, Macpeak and Seas

[57] ABSTRACT

An optical information reading device for character recognition and processing having an array of luminous diodes to illuminate the material to be read. A sensor transmits received data signals to a pattern indentification circuit. The signals are also transmitted to a light control circuit to vary the illumination to the array to provide uniform lighting of the characters to be read.

14 Claims, 5 Drawing Figures

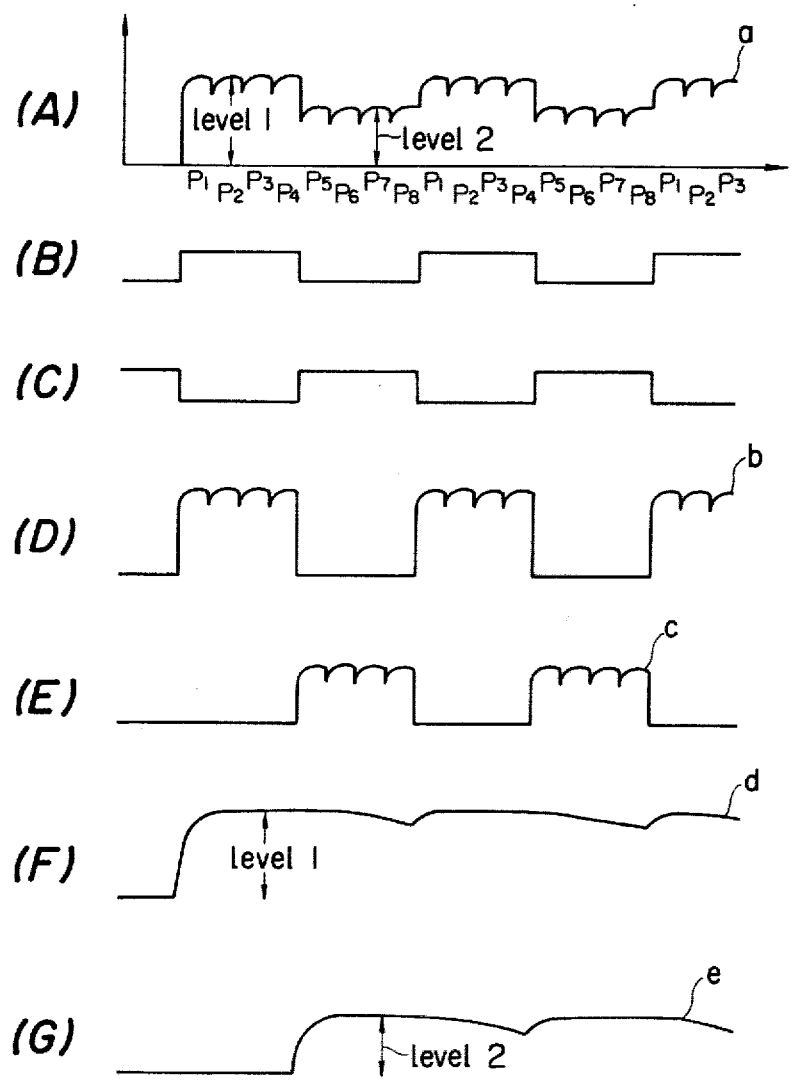

OPTICAL INFORMATION READING DEVICE

BACKGROUND OF THE INVENTION

The present invention relates to an optical information reading device which optically reads characters, signs or the like.

Optical information reading devices heretofore in use, especially hand scanners which manually scan characters and the like and optically read them, have a construction as shown for example in FIG. 1. The device recognizes the information of characters and the like by holding the scanner 1 by hand (not shown in the figure) and moving it in horizontal directions over the sheet 2 on which the information is written. The sheet 2 is illuminated by means of the light sources 3a, 3b and the information pattern is imaged via the lens system 4 on the sensor 5 made of photoelectric conversion elements arrayed in one dimension for example or in two dimensions. The output signal of the sensor 5 is processed by means of the pattern identification circuit 6. A power source 7 is used to drive these elements.

In the case of a hand scanner constructed as mentioned above which has heretofore been in use, incandescent electric lamps such as tungsten lamps or the like have usually been used for the light sources 3a, 3b. However, incandescent electric lamps such as tungsten lamps or the like have been found to be a cause of lowered efficiency of the hand scanner because they have numerous shortcomings. Generally, they consume a large amount of electric power and generate large amounts of heat. Also, they have a comparatively short life, and their center of spectral intensity is located in the infrared range where the sensitivity of Si photodiodes generally used as photoelectric conversion elements is reduced so that the matching of these two elements is poor.

On the other hand, for improvement in the operability of a hand scanner, it is necessary to make the area of the scanning opening 1a of the scanner 1 small. However, since incandescent electric lamps themselves are large in size, the number of such lamps to be used is limited. Usually, two tungsten lamps have been positioned facing each other with a lens system 4 inbetween. As a result of this configuration, they become the so-called point light source so that there is a possibility that partial halation occurs depending on the shape of the sheet 2 and this may make it impossible to carry out the reading.

Furthermore, in case where the scanner 1 gets tilted to the left, right, forward or rearward with respect to the sheet 2 or floats up from it, the illumination over the sheet 2 becomes uneven or insufficient. An accurate image of the information pattern may not be formed on the sensor 5 and the reading becomes inaccurate. With the construction of the illumination devices heretofore in use, it has been impossible to prevent this completely.

SUMMARY OF THE INVENTION

The present invention corrects the afore-mentioned short-comings and has an object to make it possible to illuminate the surface to be read uniformly at all times and to provide an optical information reading device which has excellent properties. The invention will be explained in detail with reference to an example of an embodiment of the present invention.

BRIEF DESCRIPTION OF THE DRAWINGS

FIG. 5 is an explanatory diagram of the operation wave forms.

DESCRIPTION OF THE PREFERRED EMBODIMENT

Figure 1:
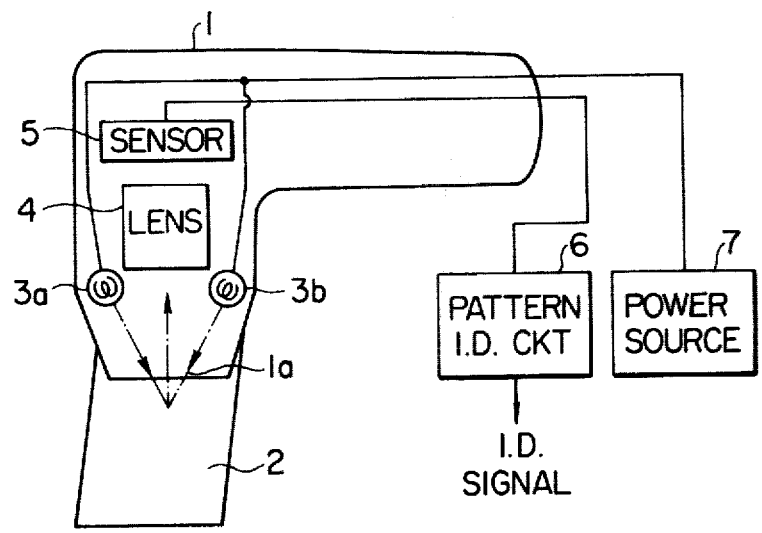
FIG. 1 is a diagram explanatory of the construction of a prior art optical information reading device.
Figure 2:
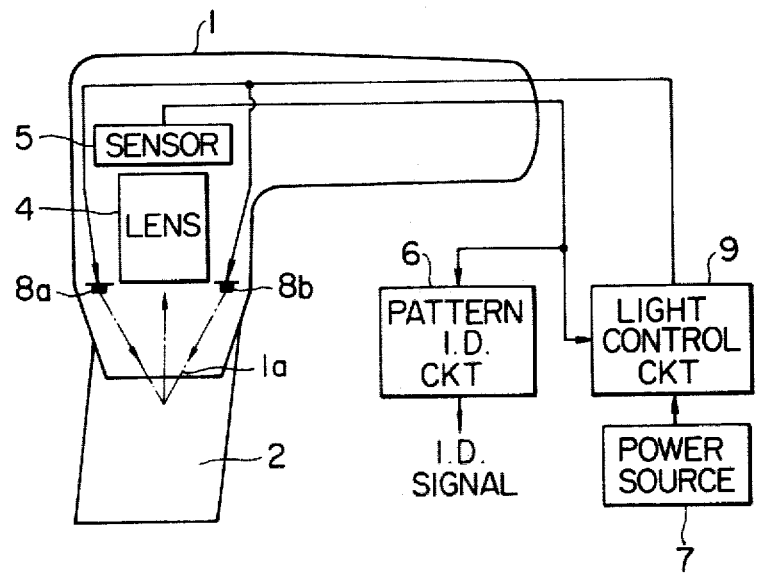
FIG. 2 is a diagram explanatory of the constitution of an optical information reading device which is an example of the preferred embodiment of the present invention.

FIG. 2 is an explanatory diagram of the construction of an example of an embodiment of the present invention. Numerals 8a, 8b denote luminous diode groups as light sources and 9 as a light amount control driving circuit. The same numbers as those in FIG. 1 denote the same parts respectively in FIG. 2.

Figure 3:
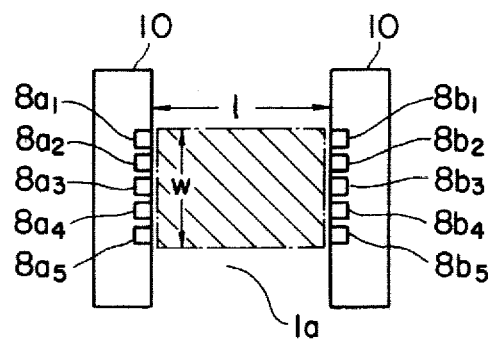
FIG. 3 is an explanatory diagram of the array of luminous diode groups.

The hand scanner of the present example has, as shown in FIG. 2, its light source made up of luminous diode groups 8a, 8b instead of incandescent electric lamps such as tungsten lamps or the like which made up such light sources in prior art devices. As shown in FIG. 3, the luminous diode groups 8a, 8b comprise luminous diode elements $8a_1-8a_5$, $8b_1-8b_5$ installed in a monodimensional array on a luminous diode installation plate 10. Since each of the luminous diode elements $8a_1-8a_5$, $8b_1-8b_5$ is very small in size when compared with incandescent lamps heretofore in use, it is possible to install a plurality of luminous diodes in the peripheral part of a scanning region. For example, l=12 mm and w=3 mm, as shown in FIG. 3 by hatching, easily without enlarging the scanning opening 1a of the scanner 1.

By virtue of such a construction, the light source becomes a linear or planar light source, which makes uniform illumination possible and hence an accurate information pattern is imaged on the sensor 5. High precision reading is possible without the occurrence of partial halation as present in the prior art devices. Additionally, luminous diodes have a comparatively long life when compared with incandescent electric lamps, and generate little heat. Furthermore, their center of spectral intensity nearly coincides with the center of sensitivity of Si photo-diodes. Hence, they have characteristic features such that the response property of the two increases, resulting in an improvement of the effectiveness of the hand scanner.

Furthermore, additional improvement can be effectuated by a construction as mentioned below with regard to the lack of uniformity of illumination or the insufficiency of illumination. This is caused by the inclination forward or backward or to the left or right or the floating of the scanner 1 with respect to the sheet 2 that may occur while the scanner 1 moves for scanning.

The construction is such that, as shown in FIG. 2, the output signals of the sensor 5 are partly applied to the light amount control driving circuit 9 and the light amount control driving circuit 9 varies the output voltage of the electric power source 7 in accordance with the variation in the output signals of the sensor 5 thereby to control the voltage applied to each luminous diode group. For example, therefore, when the scanner 1 gets inclined downward and the illumination on the upper part of the scanned surface has become insufficient, then the output of the photoelectric conversion element of the sensor 5 corresponding to that insufficiently illuminated region decreases. This is detected by the light amount control driving circuit 9 and hence the output voltage of the electric power source part 7 is controlled. The voltage applied to the luminous diode group mainly illuminating the insufficiently illuminated region is increased to effect control to have the entirety of the scanned surface illuminated uniformly at all times.

Figure 4:
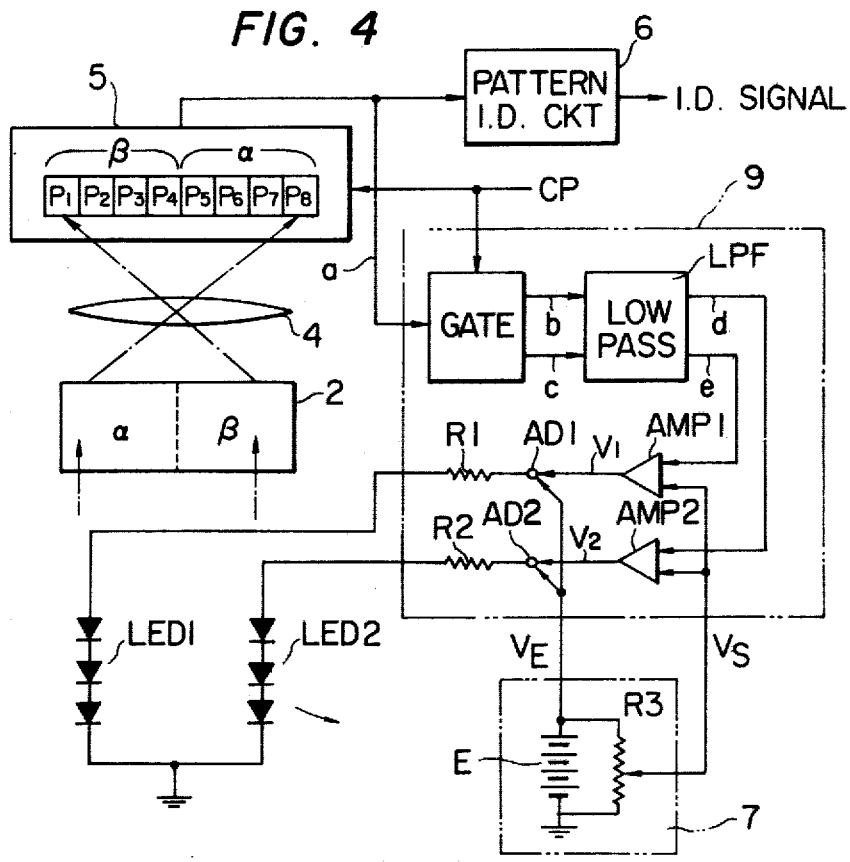
FIG. 4 is an explanatory diagram of the control system of the luminous diode groups.

FIG. 4 is an explanatory diagram of an example of the construction of the luminous diode group in a situation where the light source is made up of two sets of luminous diode groups. In FIG. 4, LED1, LED2 denote luminous diode groups, 2 the scanned surface, 4 the lens system, 5 the sensor having photoelectric conversion elements $P_1$-$P_8$ arrayed in a line, 6 the pattern indentification circuit and 9 the light amount control driving circuit. Also shown in FIG. 4 is GATE a gate circuit, LPF a low pass filter, AMP1, AMP2 differential amplifiers, AD1, AD2 adders, 7 the electric power supply, E the electric power source, $R_1$-$R_3$ resistances and a–e signals from various components.

The luminous diode groups LED1, LED2 are applied with the voltage $V_E$ from the electric power source E added at the adders AD1, AD2 with the output voltage $V_1$, $V_2$ of the differential amplifiers AMP1, AMP2, and the light emitted illuminates the scanned surface 11. Now, assume that the luminous diode group LED1 illuminates mainly the region $\alpha$ of the scanned surface 2 and the luminous diode group LED2 illuminates mainly the region $\beta$. Then, the photoelectric conversion elements $P_1$-$P_4(\beta)$ of the sensor 5 positioned in the longitudinal direction of the scanned surface 2 mainly receive the reflected light of the light emitted by the luminous diodes LED2. The photoelectric conversion elements $P_5$-$P_8$ ($\alpha$) mainly receive the reflected light of the light emitted by the luminous diodes LED1. The insufficiency of illumination on the region $\alpha$ is sensed by the lowering of the average output level of the photoelectric conversion elements $P_5$-$P_8$ ($\alpha$), and the insufficiency of illumination on the region $\beta$ as the lowering of the average output level of the photoelectric conversion elements $P_1$-$P_4(\beta)$.

The gate circuit GATE and low pass filter LPF of the light amount control driving circuit 9 detect the average output levels of the afore-mentioned photoelectric conversion elements $P_1$-$P_4$ ($\beta$), $P_5$-$P_8$ ($\alpha$). If the output signal a of the sensor 5 scanned by the clock pulse CP is, for example, a signal such as shown in FIG. 5(A), the signal a is applied to the gate circuit GATE. There, sampling is done by gate signals such as shown in FIGS. 5(B), (C), which are formed on the basis of the clock pulse CP, and output signals b, c corresponding to the photoelectric conversion elements $P_1$-$P_4$ ($\beta$), $P_5$-$P_8$ ($\alpha$) as shown in FIGS. 5(D), (E) are extracted. These signals b, c are applied to the low pass filter LPF for shaping and become direct current signals d, e which indicate the average output levels of the photoelectric conversion elements $P_1$-$P_4$ ($\beta$), $P_5$-$P_8$ ($\alpha$) as shown in FIGS. 5(F), (G). As a consequence, the scanned surface 2 will be uniformly illuminated if the light quantities of the luminous diode groups LED1, LED2 are controlled to make the levels of these direct current signals d, e become equal to a standard level.

The direct current signals d, e are applied to the input terminals on one side of the differential amplifiers AMP1, AMP2 and the standard voltage $V_S$ obtained by dividing the voltage $V_E$ of the electric power source E by means of the resistance $R_3$ is applied to the input terminals on the other side. Those signal differences are multiplied by $\mu$ in accordance with the differential amplification ratio $\mu$ at the differential amplifiers AMP1, AMP2 and are applied to the adders AD1, AD2.

For example, therefore, in the case where the average output level of the photoelectric conversion elements $P_5$-$P_8$ ($\alpha$) is small as shown in FIG. 5(A), the direct current signal e becomes smaller than the standard voltage $V_S$, and consequently the output voltage $V_1$ of the differential amplifier AMP1 increases the voltage applied to the luminous diode group LED1 resulting in an increase of the amount of light emitted. As a consequence of this action, the amount of illumination emitted on this region of the scanned surface 2 is increased and the whole of the scanned surface 2 will be uniformly illuminated and an accurate image of the pattern is formed on the sensor 5.

Thus, it is possible for the pattern recognition circuit 4 to recognize the information pattern on the surface 2 with high accuracy. Additionally, in the present embodiment, the construction is such that the photoelectric conversion elements $P_1$-$P_8$ on the sensor 5 are divided into two groups and the lack of uniformity of illumination on the scanned surface 2 is detected by means of the average output levels of the division groups of photoelectric conversion elements $P_1$-$P_4$, $P_5$-$P_8$. On the scanned surface, the ratio of the block area occupied by the part indicating the information pattern is about 2%–10%, so that the detection of the lack of uniformity of illumination is not affected by information patterns even with the afore-mentioned construction because of the interposition of the low pass filter LPF.

As an alternative method, however, it is possible also to adopt such a construction so that a plurality of photoelectric conversion elements among the photoelectric conversion elements of the sensor 5, which do not correspond to information patterns, are used as elements for light amount control signals and the output of those elements is supplied as the input to the gate circuit GATE shown in FIG. 4. If this construction is adopted, it is possible to eliminate the influence of the information pattern entirely.

Also, in the case of the control system shown in FIG. 4, the construction corrects the lack of uniformity of illumination only in the longitudinal direction of the scanned surface, and correction in the lateral direction is not taken into consideration. This is because the sensor 5 in this case is a monodimensional sensor extending in the longitudinal direction of the scanned surface 2. Hence, the lack of uniformity of illumination in the lateral direction of the scanned surface 2 is not a serious problem.

However, in case the sensor 5 is a bidimensional (planar) sensor, lack of uniformity of illumination in the lateral direction also becomes a problem. In such a case, therefore, the light source may be made up of at least four, or more, luminous diode groups which are positioned in the longitudinal and lateral directions of the scanned surface 2, the lack of uniformity of illumination in the longitudinal and lateral directions of the scanned surface 2 being detected by the bidimensional sensor and the lack of uniformity of illumination over a plane being corrected by a structure similar to that shown in FIG. 4.

As has been explained above, the present invention relates to an optical information reading device which recognizes characters, signs, etc. by illuminating them by means of a light source, scanning by means of a sensor made up of photoelectric conversion elements arrayed in one dimension or in two dimensions and processing the optical signals read by the sensor. The light source is made up of a plurality of luminous diodes in a desired shape. Since the light source becomes a linear or planar light source, the uniformity of illumination is improved and reading accuracy enhanced as compared with the tungsten lamp system heretofore in use. Furthermore, since the plurality of luminous diodes are divided into a plurality of luminous diode groups and each of the luminous diode groups is controlled by the reading signals of the sensor to enable the characters, signs, etc. to be illuminated uniformly at all times, an appropriate amount of light is uniformly emitted onto the surface to be read at all times even in case the scanner is inclined forward or backward or to the left or the right or floats up and down with respect to the surface to be read. Consequently accurate information patterns are formed on the sensor and the accuracy of reading is improved.

Furthermore, the present invention is applicable, besides hand scanners, also to optical information reading devices of the fixed type. It is apparent that other modifications can be made without departing from the scope of this invention.

What is claimed is:

1. An optical information reading device comprising; a source of electrical power, a light source actuated by said power source and comprising a plurality of luminous diodes, a sensor means for reading signals comprising an array of photoelectric conversion elements, means for processing the signals read by said sensor means, said plurality of luminous diodes divided into a plurality of luminous diode groups, and, means receiving the output of said sensor means and selectively controlling the power to said diode groups, whereby characters and the like to be read are uniformly illuminated by controlling the illumination of said luminous diode groups.

2. The device of claim 1 wherein the means to control the power comprises gate means and integrator means to detect the average output levels of said diodes, amplifier means to provide a control voltage and output means to combine said control voltage with the output of said power source.

3. The device of claim 2 further comprising timing means to establish a sampling rate for sensor means output and control said gate means.

4. The device of claim 3 wherein said gate means comprises a gate responsive to said timing means to divide said sensor means output into groups corresponding to the number of diode groups and a low pass filter receiving the output of said gate.

5. The device of claim 2 wherein said diode groups comprises two arrays of luminous diodes and said amplifier means comprises two parallel differential amplifiers, said differential amplifiers each receiving a reference voltage and a voltage indicative of the illumination of a respective array.

6. The device of claim 5 wherein said output means comprises an adder for combining the output of a respective differential amplifier with the voltage output of said power source.

7. In an optical information reading device having a light source, a power source for said light source, sensor means for reading signals comprising an array of photoelectric conversion elements, and processing means for processing the signals read by said sensor means; wherein said light source comprises a plurality of luminous diodes; and means to control the power to said diodes to provide uniform illumination comprising gate means and integrator means to detect the average output level of said diodes, amplifier means to provide a control voltage, and output means to combine said control voltage with the output of said power source.

8. The device of claim 7 further comprising timing means to establish a sampling rate for sensor means output and control said gate means.

9. The device of claim 8 wherein said plurality of luminous diodes are divided into a plurality of luminous diode groups, and wherein said gate means comprises a gate responsive to said timing means to divide said sensor means output into groups corresponding to the number of diode groups and a low pass filter receiving the output of said gate.

10. The device of claim 7 wherein said plurality of luminous diodes are divided into a plurality of luminous diode groups, and wherein said diode groups comprise two arrays of luminous diodes and said amplifier means comprise two parallel differential amplifiers, said differential amplifiers each receiving a reference voltage and a voltage indicative of the illumination of a respective array.

11. The device of claim 10 wherein said output means comprises an adder for combining the output of a respective differential amplifier with the voltage output of said power source.

12. The device of claim 1 or 7 further comprising control sensor means for providing an output signal to said means to control the power, said control sensor means comprising at least one photoconductive conversion element outside of the information pattern to provide an output signal to vary the illumination of said luminous diodes.

13. The device of claim 1 or 7 wherein said array of photoelectric conversion elements is disposed in one dimensional array.

14. The device of claim 1 or 7 wherein said array of photoelectric conversion elements is disposed in a two-dimensional array.

* * * * *